United States Patent [19]

Deiss et al.

[11] Patent Number: 5,568,403
[45] Date of Patent: Oct. 22, 1996

[54] AUDIO/VIDEO/DATA COMPONENT SYSTEM BUS

[75] Inventors: Michael S. Deiss; Charles B. Neal, both of Zionsville, Ind.

[73] Assignee: Thomson Consumer Electronics, Inc., Indianapolis, Ind.

[21] Appl. No.: 292,908

[22] Filed: Aug. 19, 1994

[51] Int. Cl.⁶ .................................................. H04L 12/00
[52] U.S. Cl. ...................................... 364/514 R; 370/60
[58] Field of Search ........................... 364/514 R, 514 A; 348/423, 420, 705, 706, 500, 461, 464, 460; 370/53, 60, 67, 124, 85.1, 99, 112; 375/20, 106, 107, 110, 112, 114

[56] References Cited

U.S. PATENT DOCUMENTS

| | | | |
|---|---|---|---|
| 4,575,759 | 3/1986 | Griepentrog et al. | 358/181 |
| 4,581,644 | 4/1986 | Deiss | 358/181 |
| 4,581,645 | 4/1986 | Beyers | 358/181 |
| 4,647,973 | 3/1987 | Deiss | 364/514 A |
| 5,119,319 | 6/1992 | Tanenbaum | 364/514 R |
| 5,467,137 | 11/1995 | Zdepski | 348/423 |

OTHER PUBLICATIONS

IS-XX Audio/Video (AV) Bus Physical Layer and Media Specifications Source (unknown) Dated 20 May 1994, pp. 1–27.

*Primary Examiner*—Emanuel T. Voeltz
*Assistant Examiner*—Thomas Peeso
*Attorney, Agent, or Firm*—Joseph S. Tripoli; Eric P. Herrmann; Ronald H. Kurdyla

[57] ABSTRACT

A system for interconnecting audio, video and data signals available in compressed form includes a bus having a plurality of channels for transmitting signal. A bus interface is located at respective signal processing devices, which interface includes a decoder to control the respective interface responsive to control signal transmitted in one of the channels. Data is transmitted in the channels in a superpacket structure. Processing devices which generate signal to be applied to the bus, such as a receiver which provides MPEG transport packets, include apparatus to form such superpackets. Respective superpackets include at least a transport packet and a timestamp related to the timing of occurrence of the transport packet. The transport packet and timestamp are located in predetermined positions within respective superpackets.

16 Claims, 4 Drawing Sheets

AUDIO/VIDEO/DATA COMPONENT SYSTEM BUS

This invention relates to a bus interface system/apparatus for coupling audio, video and data processing systems which process digital signals.

BACKGROUND OF THE INVENTION

It is known in the audio/video electronics arts to interconnect a variety of consumer electronic processing devices on a bus structure, so that signal available at one device may be utilized by another device connected on the bus. For example audio/video signal available from a television receiver may be applied to a video cassette recorder for storage, or the audio from a television receiver may be applied to a component stereo system for reproduction etc. Examples of this type of audio/video interconnect systems may be found in U.S. Pat. No. 4,575,759; 4,581,664; 4,647,973; and 4,581,645.

The signals distributed in these analog bus systems are relatively self contained. That is they include all the timing information necessary for the respective devices connected to the bus to decode the respective signals.

Currently there are a number of compressed audio and video transmission systems, such as the Grand Alliance HDTV system proposed for terrestrial high definition television broadcasting, or the DirecTV™ system which currently broadcasts compressed NTSC signal via satellite. Both systems transmit program material in transport packets, and transport packets for different programs and/or program components may be time division multiplexed in a common frequency band. Respective packets undergo noise detection/correction encoding prior to transmission and after reception, and the transport packets are thereafter reconstituted in a receiver. Recording apparatus (e.g. VCR or video disc) and authoring apparatus (e.g. cameras or camcorders) for compressed signals, on the other hand, may process the compressed signals in the same packet format, however they may not require the same noise processing. As a consequence the conveyance of signal between processing components is most conveniently effected in packet form.

A problem arises in communicating compressed signals between processing components particularly if one of the processing components is a recording device. The problem is that many transport packets of compressed data include no synchronization indicia. In addition, the transport packets may not arrive or be generated at a uniform rate. Recording apparatus, for example, require relatively precise timing for reasons of playback speed variability. That is, compressed data must be precisely located on the recording medium, if the recording device is to include a variety of playback features.

SUMMARY OF THE INVENTION

The present invention is directed to providing data in compressed form to audio, video and data processing components interconnected via a bus. Source data occurs in transport packets, such as the system level transport packets of the MPEG2 video standard. Timestamps are generated on the occurrence of respective source transport packets. A superpacket is composed of the timestamp and associated transport packet and applied to the bus for distribution amongst the processing component. At one or more of the processing components the timestamps in received superpackets may be retrieved and utilized to generate a synchronized clock for processing the transport packet carried in the superpacket. The transport packet and timestamp are located in predetermined positions within respective superpackets.

BRIEF DESCRIPTION OF THE DRAWINGS

The invention will be described with reference to the following drawings wherein.

DETAILED DESCRIPTION

Figure 1:
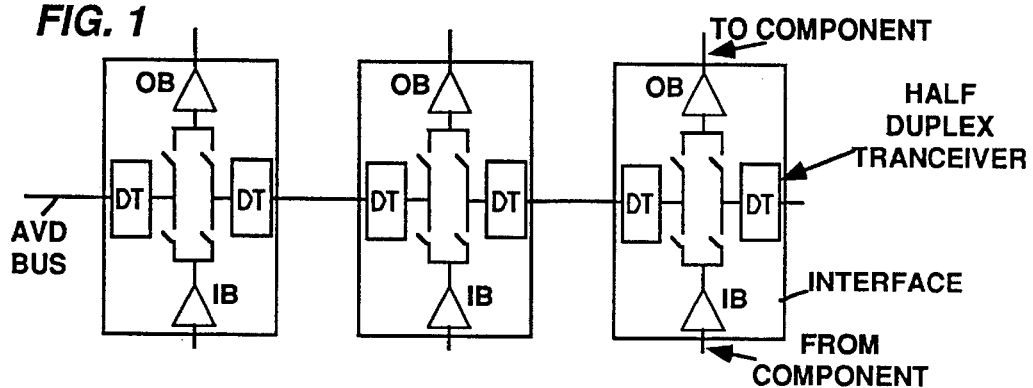
FIG. 1 is a block diagram of a daisy chain connection of the bus hardware embodying the present invention, including a number of bus/device interfaces.

Referring to FIG. 1, there is shown a cascade of AVD bus interfaces interconnected by the AVD bus. Each interface is bi-directional in that it can be conditioned to provide signal to or accept signal from a device component. It cannot do both concurrently, and will be conditioned to do one or the other for a session. Each interface includes an output buffer, OB, for driving a component device with signal provided by the bus. Each interface includes an input buffer, IB, for driving the bus with signal provided by the device component. Both the input and the output buffers are selectably coupled to the bus via switches which are controlled by a master controller. Thus the direction of applying signal to, or receiving signal from the bus may be determined with a high degree of flexibility.

Each interface may include a half duplex transceiver, at both connections to the AVD bus, for coupling signal from the bus to the interface. The bus includes a pair of control lines on which serial control signals are communicated from a master controller. The control signals may include addresses so that respective ones of the interfaces may be selectively controlled.

Figure 2:
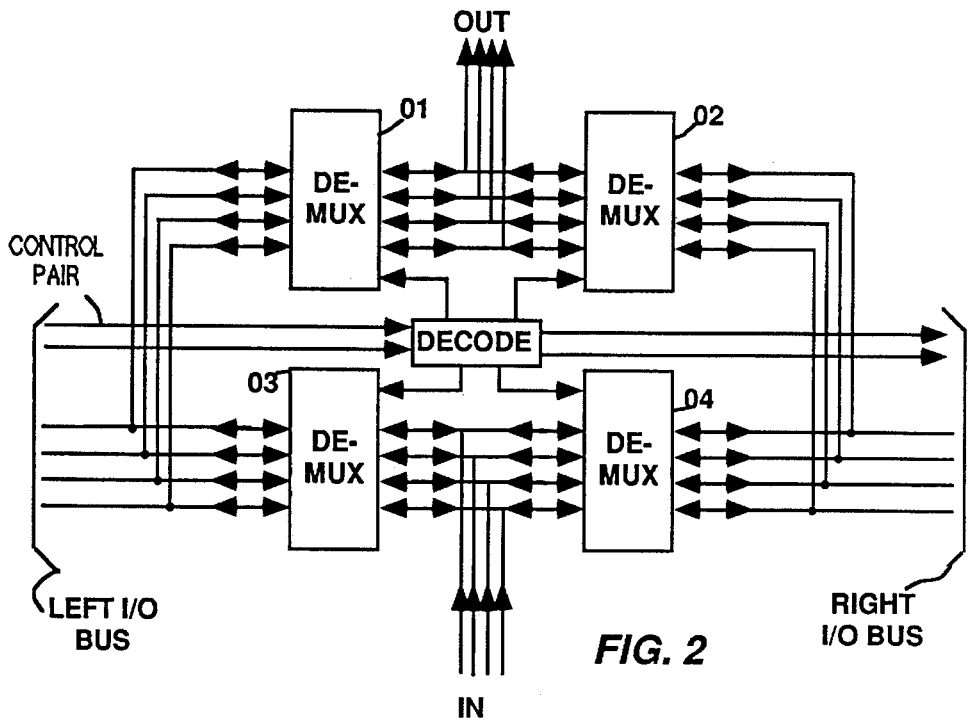
FIG. 2 is a block diagram of a portion of one of the bus interfaces.

An exemplary interface switch apparatus is illustrated in FIG. 2. In this illustration, the AVD bus is presumed to consist of three line pairs or six conductors. All of the line pairs carry bit-serial signal. Two of the conductors, (the control pair) are consigned to carry the control signals. Each decoder carries a unique address so that different control signals can be applied to respective interfaces. Responsive to control signals directed to a specific interface, the decoder outputs steering signals to the respective demultiplexers 01, 02, 03 and 04. The control signals determine: which of he respective bus conductors are coupled to the output port OUT, which is coupled to the output buffer OB; which of the respective bus conductors are coupled to the input port IN, which is coupled to the input buffer IB; and which of the conductors will transit the interface between right and left input/output ports. Inclusion of demultiplexers to selectively break the daisy chain connection, permits devices on one side of a break to communicate independently of communications between device components on the other side of the break on the same conductors. Consequently a greater number of unique communications may be performed with fewer conductors in the bus structure.

The bus conductors (excepting the control pair) are selectively coupled to the interface node OUT by respective demultiplexers 01 and 02. The bus conductors (excepting the control pair) are selectively coupled to the interface node IN by respective demultiplexers 03 and 04. All conductors from the right or from the left of the interface may be coupled to node OUT or node IN, but not concurrently to both nodes OUT and IN. Alternatively, only selected ones of the conductors may be actually coupled to the nodes OUT or IN with the remainder appropriately terminated. It will be appreciated by those skilled in the art of digital design that there are a large number of interconnect combinations made possible by the three demultiplexers. The control pair however, communicates bit serial control data, hence the control word length is limited only by decoder design. Thus if the control word length is limited to 8-bits, the number of possible interconnect combinations which may be selected is 256. The 256 combinations will accommodate the switching of many more conductors than the four illustrated. The decoder may comprise a read only memory programmed with a plurality of control functions for different control signals applied to its memory address port.

An important feature of the AVD bus system is the data or signal format. In this example it is assumed that the signal to be communicated is provided in the form of transport packets such as defined in the system layer of the MPEG2 video standard, or the transport layer of the Grand Alliance signal format. For transmission on the AVD bus, the transport packets are packaged in a further packet, designated herein as a superpacket. The contents of the superpacket include a timestamp, the transport packet and a playback rate code. The timestamp is a timing code which is a sample of a clocked counter taken at the instant of reception of the transport packet. The playback rate code, is a code used by a recording device to determine the rate at which a particular recorded signal should be played back. The playback rate is coded relative to the recording rate. The playback rate code is not read by any devices connected to the AVD bus except recorder apparatus.

The purpose of the playback rate code is to allow recording at a relatively high bit rate and playback at a normal bit rate. This feature accommodates high speed duplication and reception of e.g. video signal in high speed bursts as is contemplated in some video dial tone systems. In the latter application it is anticipated that an entire movie may be transmitted in a few minutes at very high bit rates, and recorded for subsequent playback at normal speed.

Figure 3:
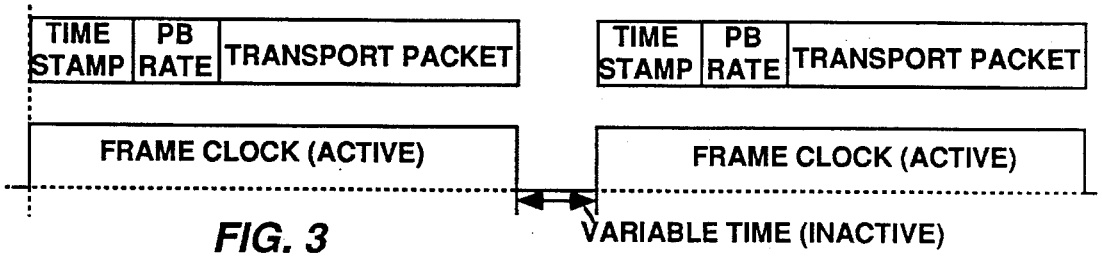
FIG. 3 is a waveform and pictorial representation of bus super packets.

FIG. 3 is a pictorial representation of the signal as conveyed on the AVD bus. A Frame Clock is provided on one of the conductors and indicates the occurrence of a superpacket which occurs on another of the AVD bus conductors When the Frame Clock is in a high state, a superpacket is framed within and coincident with the high state. The high state or active interval of the Frame Clock is constant for all packets, and in this example is equal to the duration of 191 eight bit bytes. These 191 bytes are divided between a 20-bit timestamp, a 4-bit playback rate code and a 188-byte transport packet. If a transport packet is less than 188-bytes it is loaded in the leading part of the transport packet portion of the superpacket. The preferred sequence of data is timestamp, playback rate code and then transport packet, though other arrangements are manageable. Note that while the active portions of the Frame Clock are of constant duration, the inactive intervals may be variable. This introduces considerable flexibility into the formation of superpackets.

The playback rate codes are convenient but not essential. The timestamps, on the other hand, are included because it is possible in switched bus structures to introduce jitter in the reception of transport packets at respective device components. The jitter can affect system performance, and particularly that of recording devices. The timestamps are used by the recording devices to synchronize the recording devices to the timing of the occurrence of sourced transport packets, which tends to eliminate timing jitter.

Figure 4:
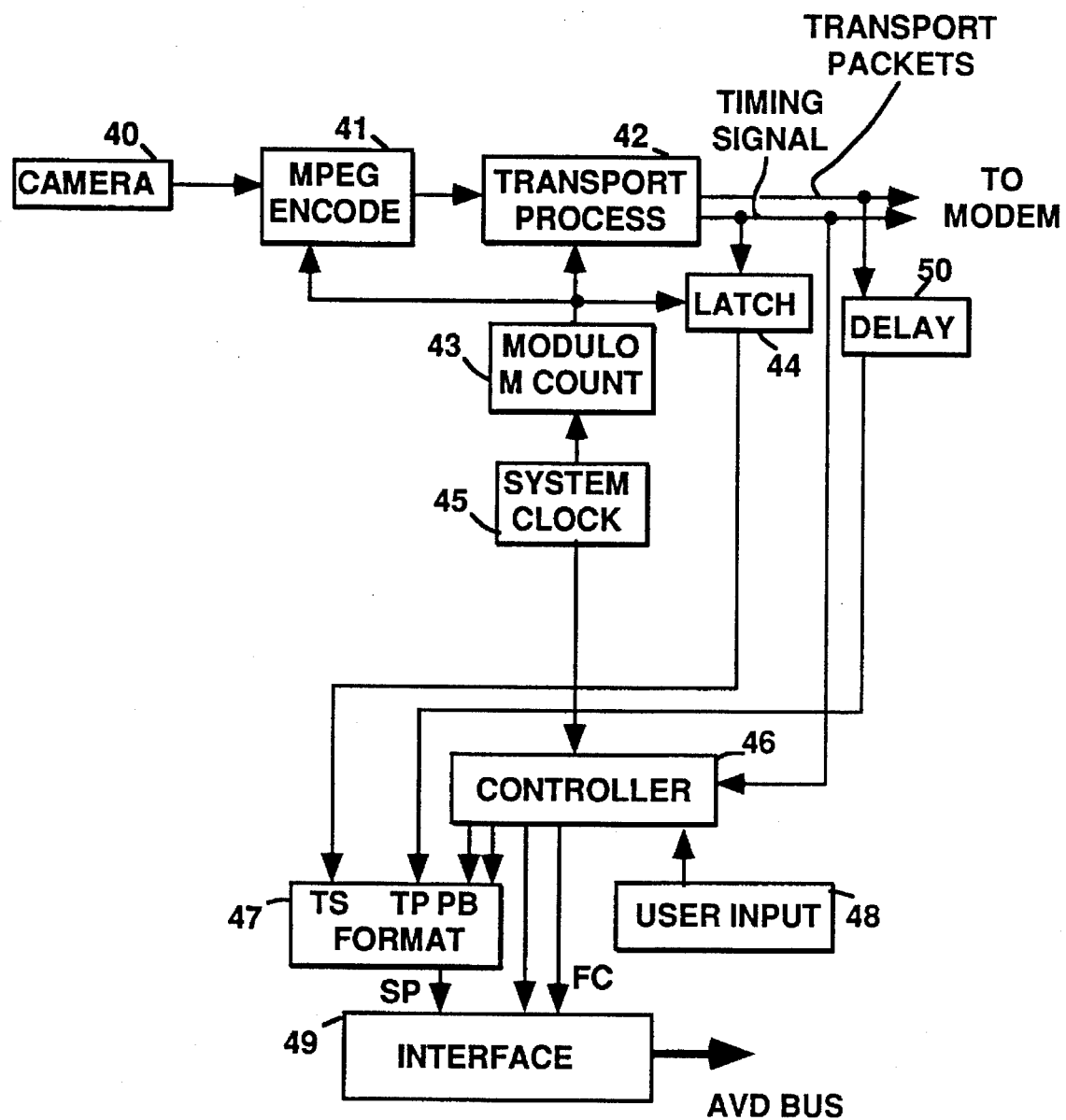
FIGS. 4 and 5 are block diagrams of apparatus for forming a superpacket.

Referring to FIG. 4, one method of generating superpackets will be described. In this example video signal is provided by a camera 40. This signal is compressed in an MPEG encoder 41, and packaged in transport packets by the transport processor 42. The MPEG encoder 41 in cooperation with a system clock 45 and a modulo M counter 43, includes presentation timestamps in the compressed video signal and the transport processor 42 also in cooperation with the modulo M counter 43 includes program clock references in ones of the transport packets. The transport processor provides bit-serial transport packets of the video signal on one output port, and in parallel therewith provides a timing signal indicative of the start of successive output transport packets.

Successive transport packets are delayed in a compensating delay element 50, and then applied to a formatter 47. At the start of each new transport packet the count exhibited in the modulo M counter 43 is captured in a latch 44, the output of which is coupled to the formatter 47. In addition a playback rate control code, PB is applied from a system controller 46 to the formatter. In this example it is presumed that the camera is operating at real time and at normal speed, hence the playback rate code will reflect a playback speed equivalent to recording speed. The speed of camera action is controlled by a user input 48, which may define a number of variable coding and compression parameters.

When the timing signal provided by the transport processor indicates the occurrence of a new transport packet, the controller 46 conditions the formatter to first output, in serial form, the timestamp (the count latched in the latch 44), then to output in serial form, the playback rate code, and finally to output in serial form, the delayed transport packet to form the superpacket. The delay incurred by the transport packet in the delay element 50 is equivalent to the time necessary to read out the timestamp and the playback rate code.

The superpackets are applied to a desired one of the conductors in the interface 49 under control of control signals present on the control pair of conductors in the interface. In addition the controller generates a Frame Clock signal which is coincident with the superpacket and which is applied to a second conductor of the AVD bus in the interface 49.

If this controller 46 is the overall system controller, it will generate the control signals which are applied to the control pair, and the selection of where the signals are directed will be under user control 48. If not, the only interaction of the controller 46 with the interface will be generation of the Frame Clock in this example.

Figure 5:
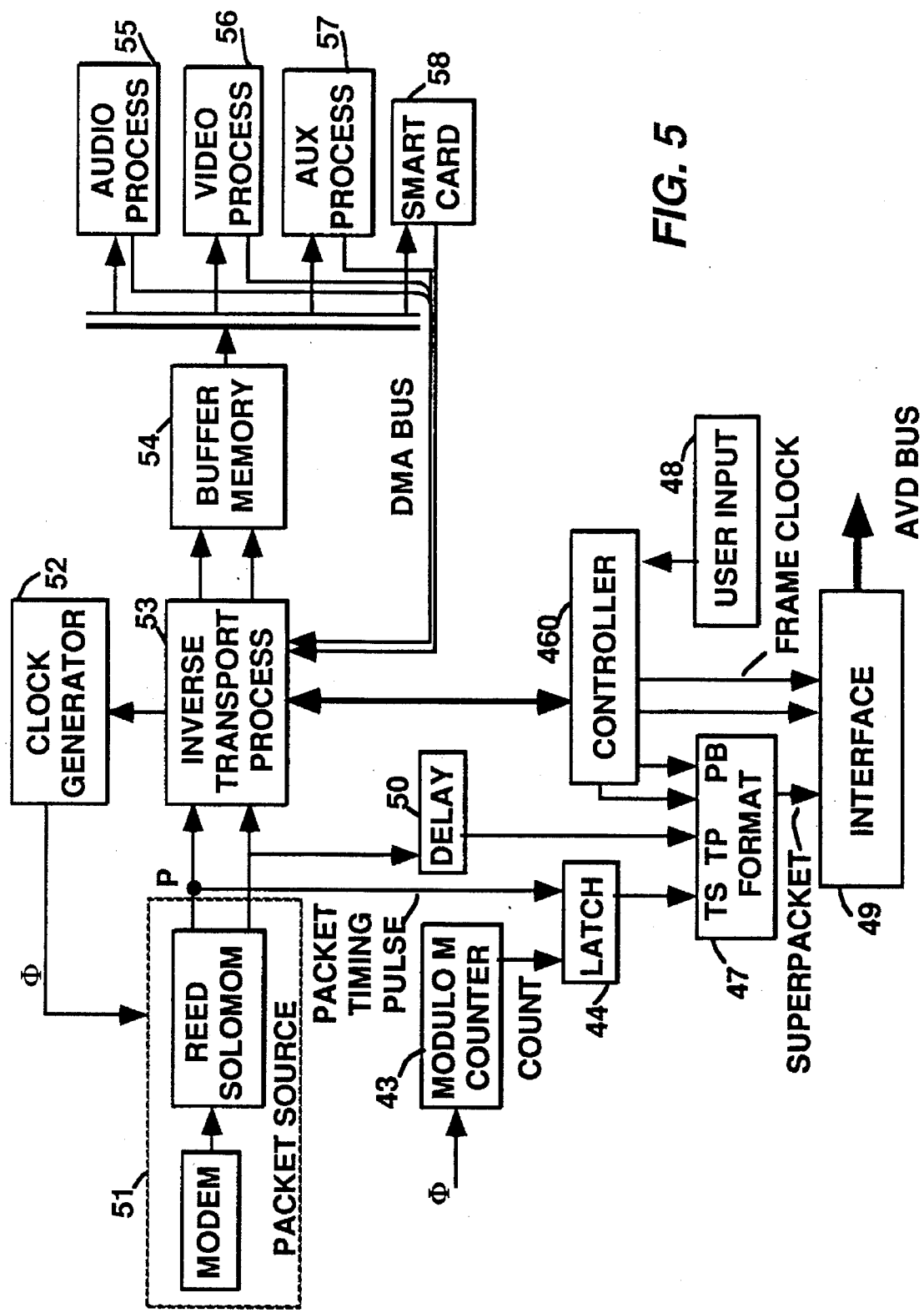

FIG. 5 illustrates a second example of a superpacket generator. In FIG. 5 elements designated with the same numbers as elements in FIG. 4 are similar and perform the same function. Transmitted transport packets are received in a modem and error corrected in the Reed Solomon decoder of the packet source 51. The packet source outputs pulses, P, coincident with the occurrence of respective transport packets to indicate their presence. The pulses P and the transport packets are applied to an inverse transport processor 53. In this example it is assumed that the signal applied to the packet source contains time division multiplexed packets pertaining to different programs and different program components. Respective packets contain program identifiers, PID's, by which they are associated with respective programs or program components. The transport processor is conditioned to select only packets associated with a desired program. The payloads of these packets are applied via a direct memory access, DMA, to a buffer memory 54. Respective program component payloads are applied to specific areas of the buffer memory. As respective program component processors 55, 56, 57 and 58 require component signal data, they request same from the processor 53, which reads the appropriate payload via the DMA structure.

Ones of the transport packets contain program clock references, PCR's, which precisely relate the creation of the transport packet to an encoder system clock. The transport processor 53 extracts these PCR's and applies them to a system cloak generator 52. Using the PCR's, the clock generator 52 generates a system clock which is frequency locked to the encoder system clock. The system clock is utilized by the inverse transport processor 53 and the packet source 51, hence the transport packets are relatively synchronized with their original creation. The generation of the system clock is similar to the clock synchronization to be described with respect to FIG. 6 below.

The system clock is counted in the modulo M counter 43, and the count value exhibited by the counter when a pulse P occurs, i.e. when the start of a new transport packet is output by the packet source, is captured in the latch 50 responsive to the pulse P. In addition the associated transport packet is applied to a compensating delay element 50. The delayed transport packet from element 50, the timestamp (count value) from latch 44, and a playback rate code from a controller 460 are applied to respective input ports of a superpacket formatter 49.

The controller 460, under user control 48, communicates with the inverse transport processor to designate which program transport packets are to be packaged in superpackets. On the occurrence of respective transport packets, the inverse transport processor provides a pulse to the controller 460 whenever a received packet is a desired transport packet. Responsive to this pulse the controller 460 conditions the formatter to form the superpacket with the current timestamp, PB and transport packet. Note in this example the delay element 50 must accommodate not only the formation time of the first two superpacket data elements but also the time required of the inverse processor to ascertain that a packet is one of the desired packets.

In the foregoing examples the timestamp is generated at the occurrence of a transport packet. Alternatively the timestamps may be generated relative to the timing of generation of the superpacket. That is the timestamp may define the instant a superpacket is to be output, or the instant assembly of the superpacket begins. In these instances the time stamp will generally be related to the leading edge of the Frame Clock, though it may not define the timing of this transition. The timestamp will still be associated with a particular transport packet because superpackets are generated to convey respective transport packets.

The Frame Clock is not a fixed frequency signal. That is the inactive portion of the Frame Clock is a variable. It is specifically desired that the time clock not be a fixed frequency clock so that superpackets may be formed at any time a transport packet is available. It is undesirable to use a fixed frequency Frame Clock, as such would force delaying the formation of a superpacket for transport packets that occurred after the beginning of an active portion of the Frame Clock until the subsequent cycle of the Frame Clock. If the timestamp is to be related to the formation of superpackets or the Frame Clock, then latches 44 in FIGS. 4 and 5 may be conditioned to capture count values by either the formatters 47 or the controllers 46 or 460 respectively.

Figure 6:
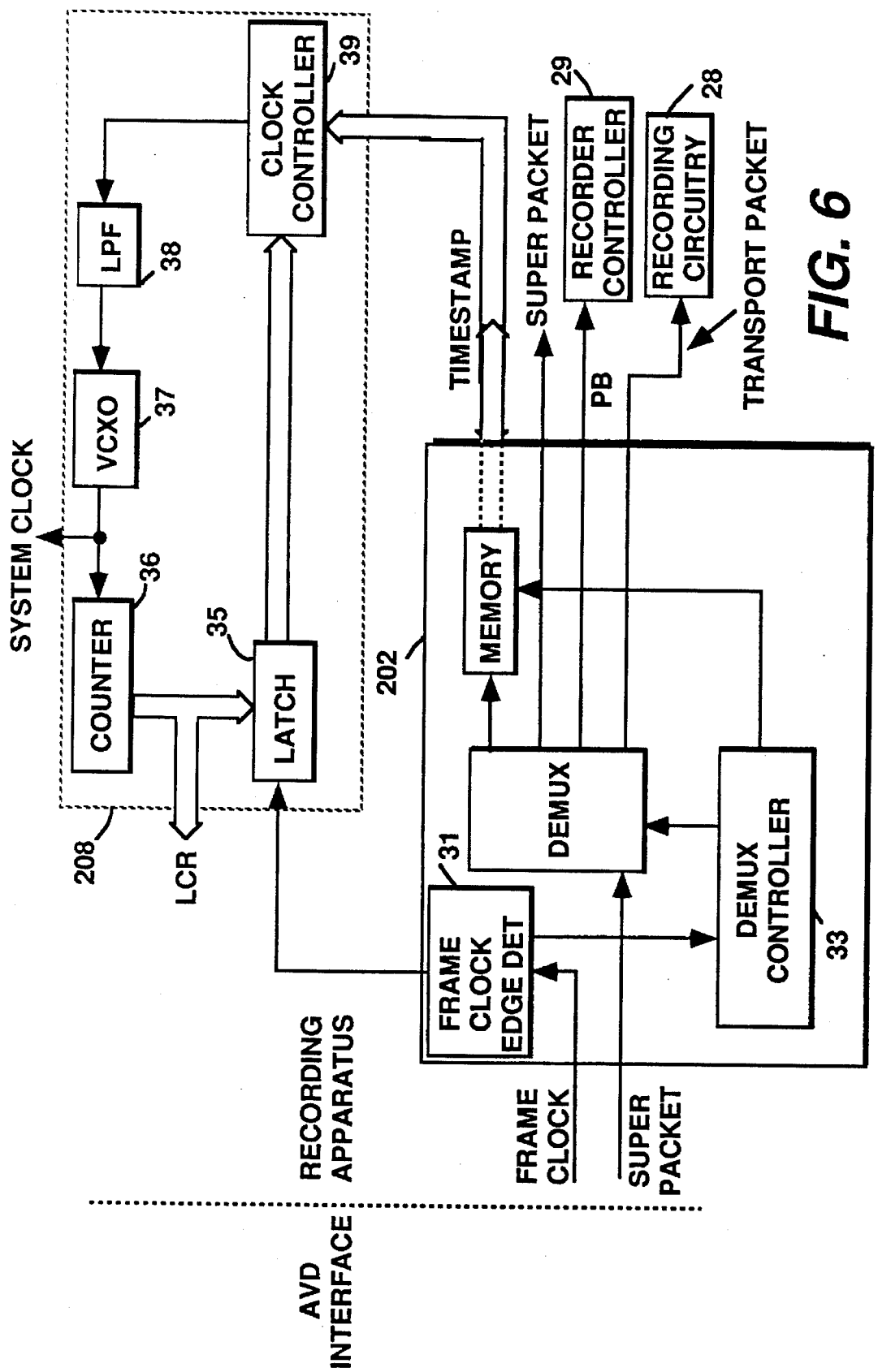
FIG. 6 is a block diagram of clock generation apparatus for synchronizing a device coupled to an interface, using timestamps contained in respective superpackets.

FIG. 6 illustrates exemplary apparatus which may be utilized in a recorder to use the timestamps for synchronization. Superpackets from one conductor of an AVD bus interface are coupled to one input port of a signal sorter 202, and the Frame Clock on another conductor of the AVD bus is applied to a second input port of the sorter 202. An edge detector, 31, detects the transition of the Frame Clock signal which defines the start of the active Frame Clock interval, and responsive to such detection, captures the count exhibited in a counter 36, in a latch 35. Counter 36 counts pulses of a voltage controlled oscillator 37 which has a free running frequency close to the frequency used to generate the superpacket timestamps.

Simultaneously with capturing the count value in the latch 35, the edge detector 31 alerts the demultiplexer controller 33 to provide a sequence of control signals for controlling the demultiplexer DEMUX to separate the components of the superpacket. The timestamp contained in the superpacket is stored in a memory which is accessed by a clock controller 39. Depending upon the form of signal the recorder is arranged to handle the DEMUX may be designed to provide the signal in a variety of formats. That is, it may provide the superpacket in toto. Alternatively it may be arranged to provide the playback rate code PB on one port which is accessed by the recorder control circuitry 29 and to provide transport packets another port accessed by recording circuitry 28.

The clock controller includes apparatus for storing successive values latched in the latch 35 and successive timestamp values stored in MEMORY. Let the successive timestamp values be designated $TS_n$ and $TS_{n+1}$. Let corresponding successive count values stored in the latch 35 be designated $LCR_n$ and $LCR_{n+1}$. The clock controller 39 reads the successive values of TS's and LCR's and forms an error signal E proportional to the differences $$E \to |TS_n - TS_{n+1}| LCR_n - LCR_{n+1}|$$

The error signal E, is applied as a control signal to condition the voltage controlled oscillator 37 to produce a frequency equal to the frequency of the system clock with which the timestamps were generated. The error signal produced by the clock controller 39 may be in the form of a pulse width modulated signal, which may be rendered into an analog error signal by implementing the low pass filter 38 in analog components.

The constraints on this system are that the counters at the two ends of the system count the same frequency or even multiples thereof. This requires that the nominal frequency of the voltage controlled oscillator be fairly close to the frequency of the system clock at the encoder.

It will be noted that the occurrence of transport packets generated by the circuitry of FIG. 5, for example, are synchronous with a system clock that has been synchronized with an encoder clock via PCR's. The occurrence of these transport packets are time stamped in cooperation with the receiver synchronous clock, and the respective transport packets are tagged with the timestamps before application to the AVD bus. At a recorder interface of the AVD bus a recorder utilizing the transport packet employs the timestamps to generate a recorder system clock which is synchronous with the transport packet and the receiver system clock.

Hence the signal packets utilized by the recorder device will be substantially jitter free.

What is claimed is:

1. A method for communicating compressed signal between components of an audio video system wherein the compressed signal is sourced in MPEG-like transport packets, and the component receiving the sourced transport packets includes a system clock, said method comprising:

counting pulses of said system clock modulo M, M an integer, to generate count values;

capturing a current count value at a predetermined instance associated with an occurrence of a sourced transport packet;

forming a bit serial superpacket containing the captured count value and corresponding transport packet in mutually exclusive portions of said superpacket;

conveying the superpacket to said components on a bus.

2. The method set forth in claim 1 further including:

generating a Frame Clock signal having an active state coincident with the duration of respective superpackets, and an inactive state in the absence of superpackets, and wherein the duration of active states is constant but the duration of inactive states is variable;

conveying said Frame Clock signal in parallel with said superpackets on said bus for use in receiving said superpackets at ones of respective said components.

3. The method set forth in claim 2 further including:

providing interfaces for selectively coupling said bus to respective said components; and providing control signals to said bus for controlling said interfaces.

4. The method set forth in claim 3 further including:

providing a bus of N conductors, N an integer, wherein two of said N conductors are dedicated to said control signals;

providing interfaces which are interposed in cascade connection along said bus that include switch means for interconnecting respective portions of at least some conductors in said bus; and controlling said switch means for isolating sections of at least some conductors in said bus with said control signals.

5. A method for communicating compressed signal between components of an audio video system wherein compressed signal is sourced in transport packets, and a component receiving the sourced transport packets includes a system clock, said method comprising:

counting pulses of said system clock modulo M, M an integer, to generate count values;

capturing a current count value at a predetermined instance associated with an occurrence of a sourced transport packet;

providing playback rate codes for use by a recording component, which playback rate codes define a ratio relating the rates of reception of signal to be recorded and the rate that such signal be played back; and forming a bit serial superpacket containing the captured count value, said playback rate codes, and corresponding transport packet in mutually exclusive portions of said superpacket; and conveying the superpacket to said components on a bus.

6. The method set forth in claim 5 wherein the step of forming said superpackets includes assembling said count value, said playback rate code and said transport packet in the sequence recited.

7. The method set forth in claim 5 wherein said transport packets consist of N eight-bit-bytes, N an integer and the step of forming said superpackets includes forming respective packets of N plus three eight-bit-bytes.

8. Apparatus for conveying compressed signal between components of an audio video system comprising:

an AVD bus including conductor sections coupled in cascade connection with bus interfaces, respective said conductor sections including a plurality of conductors, at least one of which is reserved for control signals, and respective said interfaces comprising;

first and second bi-directional input/output ports for connection to respective conductor sections;

an input port connected to a first intermediate node for coupling an output of a component to said AVD bus;

an output connected to a second intermediate node for coupling an input of said component to said AVD bus;

first and second switch means, responsive to control signals, for selectively respectively coupling corresponding conductors of said first and second bi-directional input/output ports to said first intermediate node;

third and fourth switch means, responsive to control signals, for selectively respectively coupling said corresponding conductors of said first and second bi-direction input/output ports to said second intermediate node; and control means for providing said control signals.

9. The apparatus set forth in claim 8 wherein said first and second bi-directional input/output ports each include a half duplex transceiver.

10. An interface for conveying transport packet signals on a bi-directional AVD bus to respective AVD components, said interface comprising:

a source of compressed signal occurring in MPEG-like transport packets;

a system clock;

a modulo M counter for counting pulses of said system clock and providing count values;

means for capturing a count value at a predetermined instant associated with a respective MPEG-like transport packet;

a formatter, coupled to said source, said means for capturing a count value and said AVD bus, for assembling a superpacket including a captured count value and associated MPEG-like transport packet in mutually exclusive portions of said superpacket, and applying said superpacket to said AVD bus.

11. The apparatus set forth in claim 10, further including:

means, coupled to said AVD bus, for generating a Frame Clock having active states coincident with said superpackets, and inactive states in the absence of superpackets, said active states being of constant duration and said inactive states being of variable duration, said Frame Clock for use by respective said components for detecting said superpackets.

12. The apparatus set forth in claim 11, further including:

a source of playback rate codes coupled to said formatter and wherein said formatter composes superpackets including a captured count value, a playback rate code and an associate transport packet in the order recited.

13. The apparatus set forth in claim 10 wherein one of said components includes circuitry responsive to said superpackets comprising:

a controlled oscillator for providing clock pulses for use by said one of said components;

a modulo K counter, K an integer, for counting said clock pulses to provide local count values;

means responsive to occurrences of each superpacket on said AVD bus for capturing a current local count value exhibited by said modulo K counter;

means coupled to said AVD bus for extracting the count value in each said superpacket;

clock control circuitry, responsive to said count value extracted from the superpacket and captured said local count value for generating an oscillator control signal for application to said controlled oscillator to condition said controlled oscillator to provide clock pulses at a desired frequency.

14. Apparatus for communicating compressed data, occurring in a stream of multiplexed transport packets, amongst component devices, comprising a source of said transport packets, means for generating timestamps associated with respective said transport packets, and means for forming a superpacket including said timestamp and an associated transport packet in mutually exclusive fields of said superpacket, and applying same to a bus interconnecting said component devices.

15. The apparatus set forth in claim 14 further including:

a buffer memory;

an inverse transport processor, coupled to said source of transport packets and responsive to said stream of multiplexed transport packets, for selecting transport packets related to a single program, and applying payloads of selected said transport packets to said buffer memory; and respective signal decompression apparatus, coupled to said buffer memory, for reading selected said payloads form said buffer memory and decompressing program components associated with selected said payloads.

16. Apparatus for receiving a stream of superpackets, including timestamps and transport packets as described in claim 14 comprising:

means for determining the occurrence of said superpackets;

means for extracting a timestamp from respective said superpacket; and means responsive to a superpacket and extracted said timestamp for separating a transport packet from said superpacket and providing a substantially jitter free transport packet.

\* \* \* \* \*